(12) United States Patent
Mizunuma et al.

(10) Patent No.: US 9,996,181 B2
(45) Date of Patent: Jun. 12, 2018

(54) INFORMATION PROCESSING APPARATUS, INFORMATION PROCESSING METHOD, AND PROGRAM

(75) Inventors: Hiroyuki Mizunuma, Tokyo (JP); Kazuyuki Yamamoto, Kanagawa (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 692 days.

(21) Appl. No.: 13/422,451

(22) Filed: Mar. 16, 2012

(65) Prior Publication Data

US 2012/0242616 A1    Sep. 27, 2012

(30) Foreign Application Priority Data

Mar. 23, 2011 (JP) .................................. 2011-064045

(51) Int. Cl.
*G06F 3/041* (2006.01)
*G06F 1/16* (2006.01)
*G06F 3/044* (2006.01)

(52) U.S. Cl.
CPC .......... *G06F 3/0416* (2013.01); *G06F 1/1626* (2013.01); *G06F 3/044* (2013.01)

(58) Field of Classification Search
USPC ................................................. 345/174, 173
See application file for complete search history.

(56) References Cited

U.S. PATENT DOCUMENTS

| 2008/0068347 A1* | 3/2008 | Morohoshi | .................... | 345/173 |
|---|---|---|---|---|
| 2010/0073318 A1 | 3/2010 | Hu et al. | | |
| 2010/0085322 A1* | 4/2010 | Mamba et al. | ................ | 345/173 |
| 2010/0265211 A1* | 10/2010 | Oishi et al. | .................... | 345/174 |
| 2011/0216033 A1* | 9/2011 | Mamba et al. | ................ | 345/174 |
| 2011/0279406 A1* | 11/2011 | Kawaguchi et al. | ......... | 345/174 |
| 2011/0285642 A1* | 11/2011 | Lee et al. | ....................... | 345/173 |
| 2011/0304567 A1* | 12/2011 | Yamamoto et al. | .......... | 345/173 |
| 2013/0155003 A1* | 6/2013 | Kwon | ................... | G06F 3/0416 345/174 |
| 2013/0285975 A1* | 10/2013 | Hong | ..................... | G06F 3/044 345/174 |

FOREIGN PATENT DOCUMENTS

| CN | 101498979 A | 8/2009 |
|---|---|---|
| JP | 2005-149531 | 6/2005 |
| JP | 2007-512619 | 5/2007 |
| JP | 2010-113445 | 5/2010 |

OTHER PUBLICATIONS

Jan. 6, 2015, JP communication issued for related JP application No. 2011-064045.
Jan. 20, 2016, Chinese Office Action for related CN Application No. 201210070933.9.

* cited by examiner

*Primary Examiner* — Fred Tzeng
(74) *Attorney, Agent, or Firm* — Paratus Law Group, PLLC (57) ABSTRACT

An information processing apparatus includes a sensor electrode, a detection unit, and a determination unit. The sensor electrode has a capacitance changed in accordance with an operation to an operation surface. The detection unit is configured to detect, based on a change of the capacitance, a displacement of an operation point of the operation surface. The determination unit is configured to determine a press to the operation surface based on a displacement of a capacitance value of the sensor electrode and the displacement of the operation point.

15 Claims, 12 Drawing Sheets

INFORMATION PROCESSING APPARATUS, INFORMATION PROCESSING METHOD, AND PROGRAM

BACKGROUND

The present disclosure relates to an information processing apparatus including a touch sensor of a capacitive system, an information processing method, and a program.

From the past, a touch device of a capacitive system has been known. For example, Japanese Patent Application Laid-open No. 2010-113445 (hereinafter, referred to as Patent Document 1) discloses a touch panel capable of detecting a touch of a finger based on a change of a capacitance. In this touch panel, a threshold value is set for a capacitance value. Based on a change amount of a capacitance value with the threshold value as a reference, a pressing operation by a finger is recognized. Thus, continuous pressing operations at the same point can be performed without a finger leaving an operation surface.

SUMMARY

However, with the touch panel disclosed in Patent Document 1, it is difficult to detect continuous pressing operations to a plurality of buttons and the like located at different points. Specifically, in the case where continuous pressing operations are performed while a finger is being moved on the operation surface, it is difficult to determine such pressing operations highly accurately.

In view of the circumstances as described above, it is desirable to provide an information processing apparatus, an information processing method, and a program that are capable of determine a pressing operation highly accurately.

According to an embodiment of the present disclosure, there is provided an information processing apparatus including a sensor electrode, a detection unit, and a determination unit.

The sensor electrode has a capacitance changed in accordance with an operation to an operation surface.

The detection unit is configured to detect, based on a change of the capacitance, a displacement of an operation point of the operation surface.

The determination unit is configured to determine a press to the operation surface based on a displacement of a capacitance value of the sensor electrode and the displacement of the operation point.

In the information processing apparatus, the displacement of the operation point is detected based on the change of the capacitance of the sensor electrode. Further, based on the displacement of the capacitance value of the sensor electrode and the displacement of the operation point, the press to the operation surface is determined. Accordingly, a pressing operation can be determined highly accurately.

The detection unit may calculate a coordinate value of the operation point. In this case, the determination unit may determine the press based on a correlation between the displacement of the capacitance value and a displacement of the coordinate value.

In such a manner, when attention is given to the correlation between the displacement of the capacitance value and the displacement of the coordinate value, a pressing operation can be determined highly accurately.

The determination unit may determine the press based on an inclination of a regression line of the capacitance value and the coordinate value.

In such a manner, a pressing operation may be determined based on the inclination of the regression line of the capacitance value and the coordinate value.

The determination unit may determine the press based on a correlation coefficient between the capacitance value the coordinate value.

In such a manner, a pressing operation may be determined based on the correlation coefficient between the capacitance value and the coordinate value.

The detection unit may calculate the coordinate value of each of a plurality of operation points. In this case, the determination unit may determine the press at each of the plurality of operation points.

In the information processing apparatus, a pressing operation at each of a plurality of operation points can be determined.

According to an embodiment of the present disclosure, there is provided an information processing method including detecting, by a detection unit, a displacement of an operation point of an operation surface based on a capacitance of a sensor electrode that is changed in accordance with an operation to the operation surface.

By a determination unit, a press to the operation surface is determined based on a displacement of a capacitance value of the sensor electrode and the displacement of the operation point.

According to an embodiment of the present disclosure, there is provided a program causing a computer to function as a detection unit and a determination unit.

The detection unit is configured to detect a displacement of an operation point of an operation surface based on a capacitance of a sensor electrode that is changed in accordance with an operation to the operation surface.

The determination unit is configured to determine a press to the operation surface based on a displacement of a capacitance value of the sensor electrode and the displacement of the operation point.

The program may be recorded on a recording medium.

As described above, according to the present disclosure, a pressing operation can be determined highly accurately.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

[Structure of Information Processing Apparatus]

Figure 1:
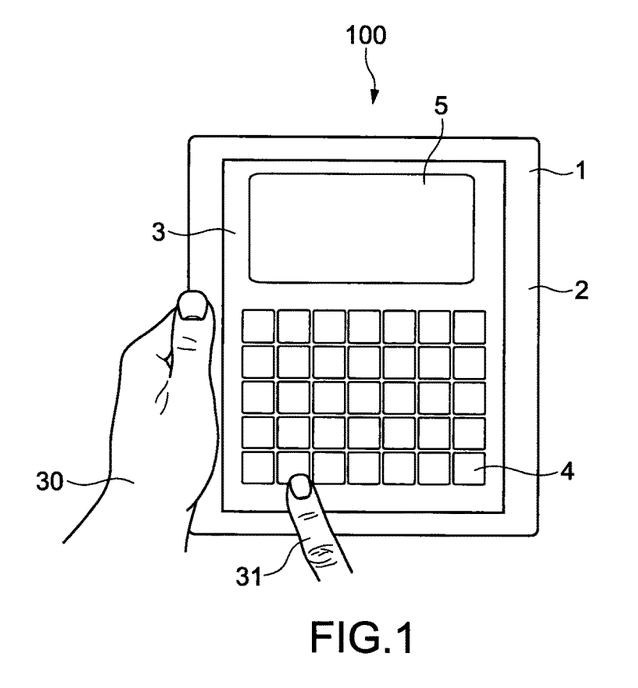
FIG. 1 is a view schematically showing an outer appearance of an information processing apparatus according to a first embodiment of the present disclosure.
Figure 2:
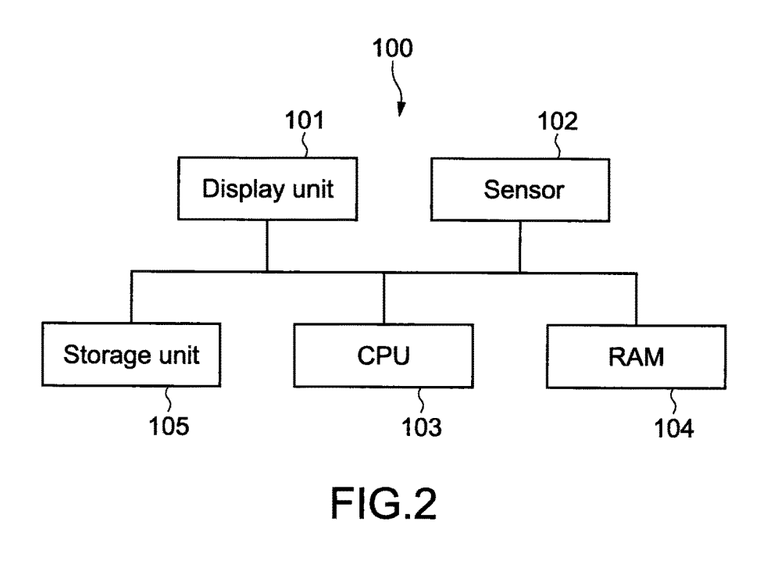
FIG. 2 is a block diagram showing a structural example of the information processing apparatus shown in FIG. 1.

FIG. 1 is a view schematically showing an outer appearance of an information processing apparatus according to a first embodiment of the present disclosure. FIG. 2 is a block diagram showing a structural example of the information processing apparatus shown in FIG. 1. In this embodiment, as the information processing apparatus, a portable terminal 100 including a touch panel, such as a smartphone or a tablet terminal, is used.

The portable terminal 100 includes a casing 1 held by a user 30 and a display surface 3 provided to a front surface 2 of the casing 1. The material and size of the casing 1 can be set as appropriate.

On the display surface 3, for example, a plurality of buttons 4 for inputting numbers, characters, and the like, an image 5, and the like are displayed. In addition, various GUIs (Graphical User Interfaces) are displayed on the display surface 3.

As shown in FIG. 2, the portable terminal 100 includes a display unit 101, a sensor 102, a CPU (Central Processing Unit) 103, a RAM (Random Access Memory) 104, and a storage unit 105.

The display unit 101 is a display device using, for example, liquid crystal or EL (Electro-Luminescence). The storage unit 105 is a nonvolatile storage device and is, for example, an HDD (Hard Disk Drive), a flash memory, or other solid-state memory.

Figure 3:
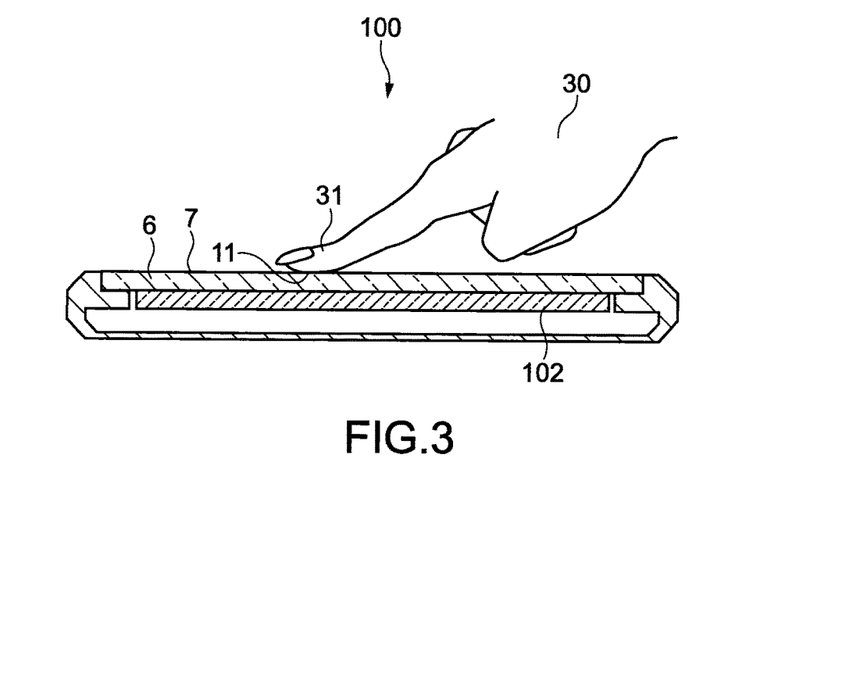
FIG. 3 is a schematic cross-sectional view of a portable terminal, for describing a sensor shown in FIG. 2.

FIG. 3 is a schematic cross-sectional view of the portable terminal 100, for describing the sensor 102. As shown in FIG. 3, the portable terminal 100 includes a display cover 6 formed of an insulating material such as glass. The display cover 6 constitutes the display surface 3 described above, and an upper surface of the display cover 6 functions as an operation surface 7.

The sensor 102 is provided to a lower portion of the display cover 6. The sensor 102 includes sensor electrodes having a capacitance that varies in accordance with an operation by the user 30 to the operation surface 7. FIG. 4 are schematic diagrams showing a structural example of the sensor electrodes 8 described above.

Figure 4A:
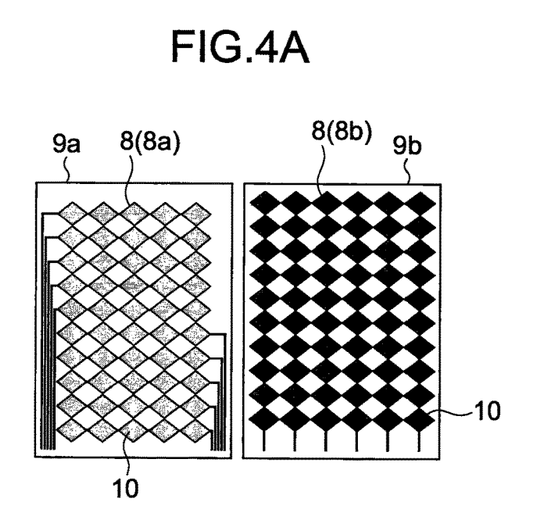
FIG. 4 are schematic diagrams showing a structural example of sensor electrodes included in the sensor shown in FIG. 3.

As shown in FIG. 4A, two substrates of an X-electrode substrate 9a and a Y-electrode substrate 9b that are formed of a transparent material such as a PET (polyethylene terephthalate) substrate are used. Then, as the sensor electrodes 8, an X transparent electrode 8a and a Y transparent electrode 8b that are formed of a transparent conductive material such as an ITO (Indium Tin Oxide) are formed on the X-electrode substrate 9a and the Y-electrode substrate 9b, respectively. In this embodiment, a plurality of electrode pads 10 are formed as the X transparent electrode 8a and the Y transparent electrode 8b.

Figure 4B:
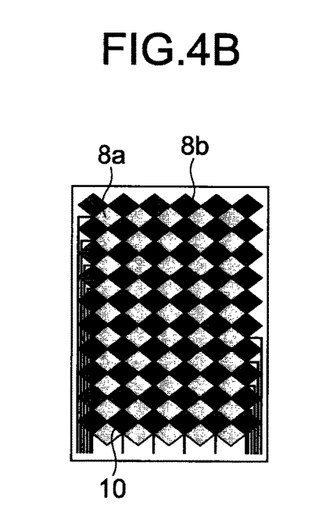

As shown in FIG. 4B, the two substrates of the X-electrode substrate 9a and the Y-electrode substrate 9b are laminated on each other and provided to the lower portion of the display cover 6. The sensor 102 includes a circuit unit (not shown), and voltages are applied to the X transparent electrode 8a and the Y transparent electrode 8b by the circuit unit. Then, a capacitance value of each of the X transparent electrode 8a and the Y transparent electrode 8b is detected by the circuit unit. The detected capacitance values are transmitted from the circuit unit to the CPU 103.

When a finger 31 and the like come into contact with or come close to the operation surface 7, the capacitance values of the respective transparent electrodes 8a and 8b are changed due to electrostatic induction caused between the finger 31 and the like and the transparent electrodes 8a and 8b. Based on such a change of the capacitance values, coordinate values of an operation point 11 on the operation surface 7 are calculated by the CPU 103. The operation point 11 refers to a point at which the finger 31 and the like come into contact with or come close to the operation surface 7.

Figure 5:
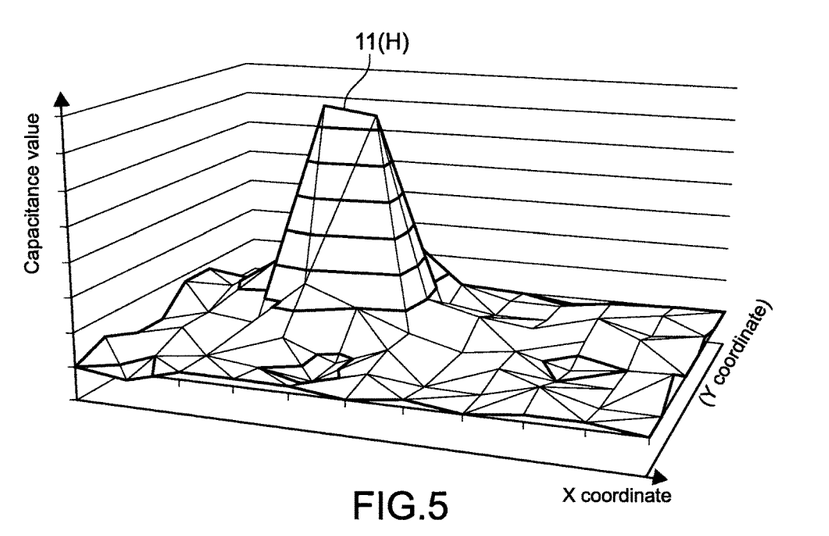
FIG. 5 is a graph showing an example of measurement results of capacitance values detected by the sensor according to the first embodiment.
Figure 6:
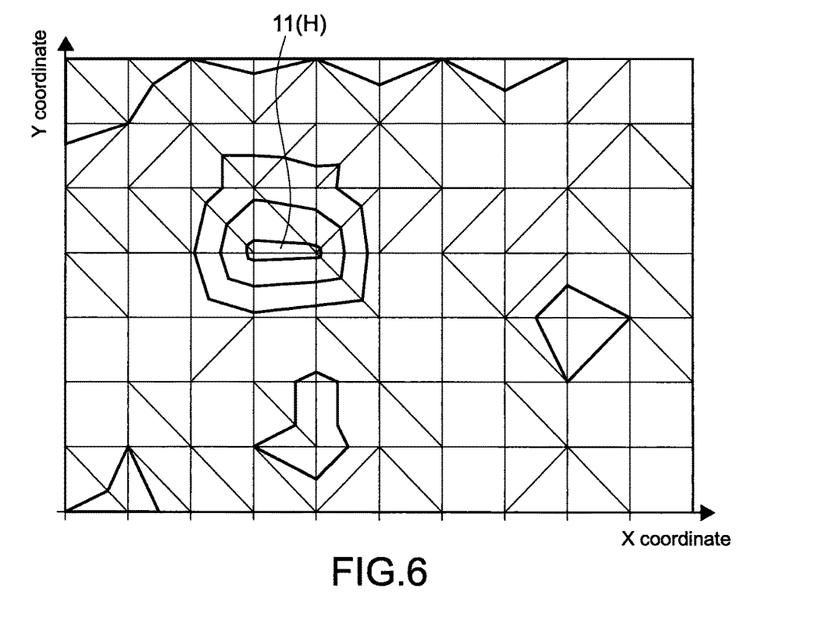
FIG. 6 is a diagram in the case of viewing the graph shown in FIG. 5 from above, showing a distribution of capacitance values on an operation surface.

FIG. 5 is a graph showing an example of measurement results of capacitance values detected by the sensor 102. FIG. 6 is a diagram in the case of viewing the graph shown in FIG. 5 from above, showing a distribution of capacitance values on the operation surface 7. As shown in FIG. 5, in this embodiment, a capacitance value is high at the operation point 11 on the operation surface 7. As shown in FIG. 6, coordinate values of the operation point 11 are calculated based on a position of a portion H where a capacitance value is high.

Figure 7A:
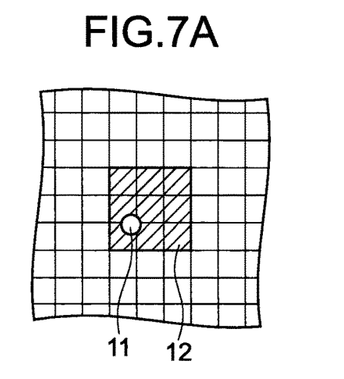
FIG. 7 are diagrams for describing the capacitance value in the first embodiment.
Figure 7B:
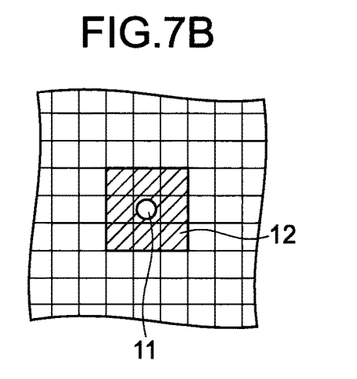

FIG. 7 are diagrams for describing the capacitance value in this embodiment. In this embodiment, a capacitance peak value at the operation point 11 and a value of a periphery 12 of the operation point 11 are combined and a combination value thus obtained is assumed to be a capacitance value of the operation point 11. As shown in FIGS. 7A and 7B, how to select the periphery 12 of the operation point 11 can be set as appropriate.

As will be described later, in the present disclosure, attention is given to a displacement of the operation point 11, which accompanies a pressing operation. For example, when the operation point 11 is slightly displaced, a capacitance peak value may be largely changed depending on how the finger 31 moves over the sensor electrodes 8. Therefore, when the combination value is assumed to be a capacitance value of the operation point 11, a capacitance value can be stably detected. However, the capacitance peak value may be used as it is as the capacitance value of the operation point 11.

Further, in this embodiment, as the capacitance value, a value that has been subjected to signal processing such as filter processing is used. Through such signal processing and the like, it is possible to highly accurately perform, for example, displacement detection processing for an operation point and press determination processing. However, the filter processing and the like may not be performed. A definition of the capacitance value can be set as appropriate.

In the case where the user 30 moves the finger 31 and the like, the capacitance values of the respective X transparent electrode 8a and Y transparent electrode 8b are also changed. Specifically, the position of the portion H shown in FIG. 5, in which the capacitance value is high, is changed. Based on the change of the position of the portion H, the displacement of the operation point 11 is detected by the CPU 103. In other words, in this embodiment, the CPU 103 functions as a detection unit.

Further, in this embodiment, as will be described later, a press to the operation surface 7 is determined by the CPU 103 based on the displacement of the capacitance values of the sensor electrodes 8 and the displacement of the operation point 11. In other words, in this embodiment, the CPU 103 also functions as a determination unit.

The above-mentioned displacement detection processing for the operation point 11, press determination processing, and the like by the portable terminal 100 are realized by cooperation of software stored in the storage unit 105, a ROM (Read Only Memory) (not shown), and the like and hardware resources of the portable terminal 100. Specifically, the CPU 103 loads to the RAM 104 a program that constitutes software and is stored in the storage unit 105 and the like and executes the program so that various types of information processing are realized.

[Press Determination Processing]

Figure 8:
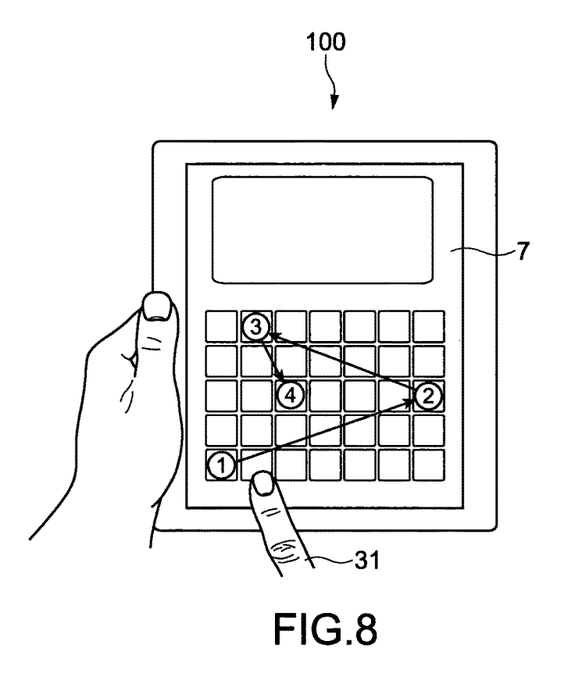
FIG. 8 is a schematic diagram showing an example of pressing operations that are continuously performed while a finger is being moved.

The press determination processing will now be described. For example, as shown in FIG. 8, it is assumed that a pressing operation is input on the operation surface 7 without releasing the finger 31 from the operation surface 7 in order of numerals 1 to 4. In such a case, it is difficult to accurately determine the pressing operation by the press determination technique disclosed in Japanese Patent Application Laid-open No. 2010-113445.

Figure 9:
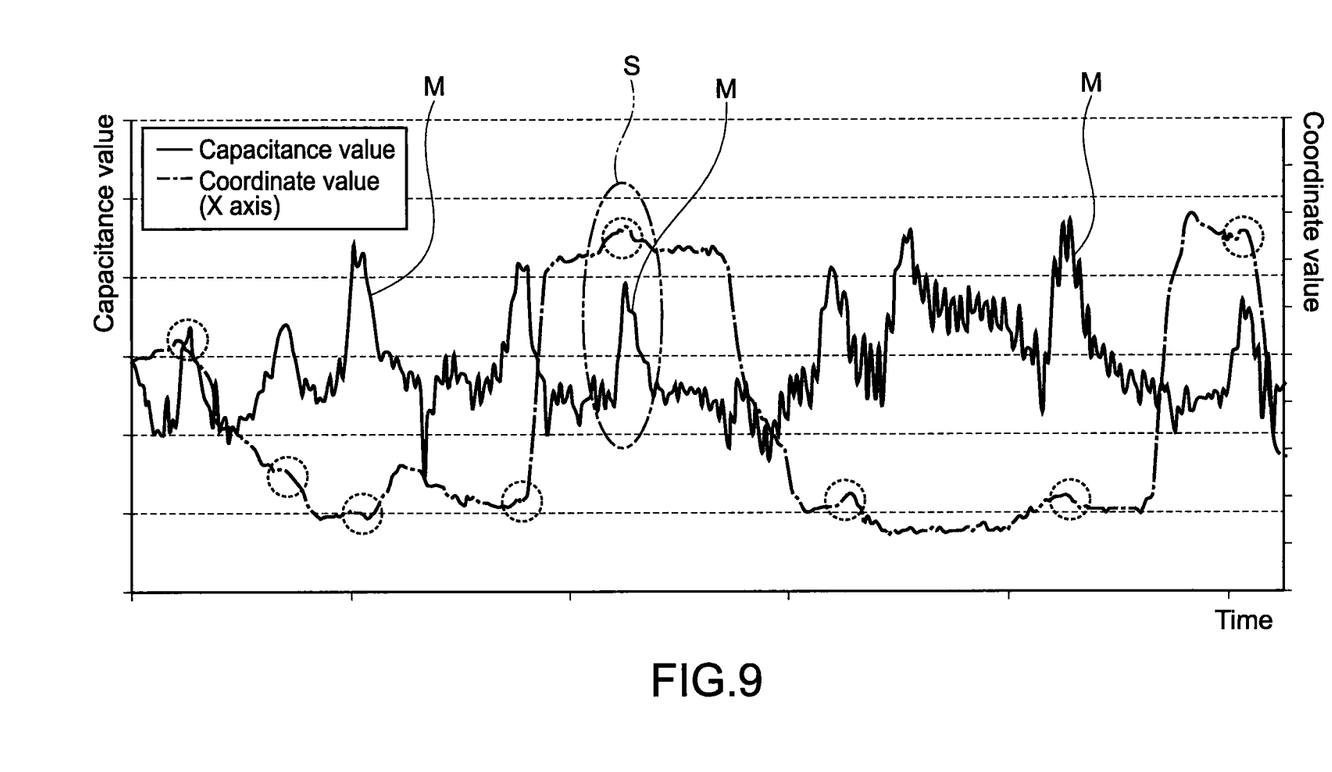
FIG. 9 is a graph showing a capacitance value and a coordinate value obtained when continuous pressing operations are performed while moving a finger on the operation surface according to the first embodiment.

FIG. 9 is a graph showing a capacitance value and a coordinate value obtained when continuous pressing operations are performed while moving a finger on the operation surface 7. The capacitance value shown in FIG. 9 refers to a capacitance value at an operation point. In other words, the capacitance value is a displacement along a time, of a capacitance value at the portion H shown in FIG. 5. The displacement of a "capacitance value of an operation point" corresponds to the "displacement of a capacitance value".

The displacement of the coordinate value shown in FIG. 9 is a displacement of the operation point 11 with respect to an X axis (displacement of X coordinate). Specifically, the portion H shown in FIG. 5, in which the capacitance value is high, is moved along the X axis as shown in FIG. 9. In this embodiment, information on the displacement of the capacitance value and information on the displacement of the operation point with respect to a Y axis (displacement of Y coordinate) are also obtained.

In this embodiment, when a pressing operation is input to the operation surface 7, a capacitance value instantaneously becomes large. Therefore, in the graph of the capacitance value shown in FIG. 9, there is a possibility that a pressing operation has been input at a portion M that is sharply displaced in the shape of a spike.

Figure 10:
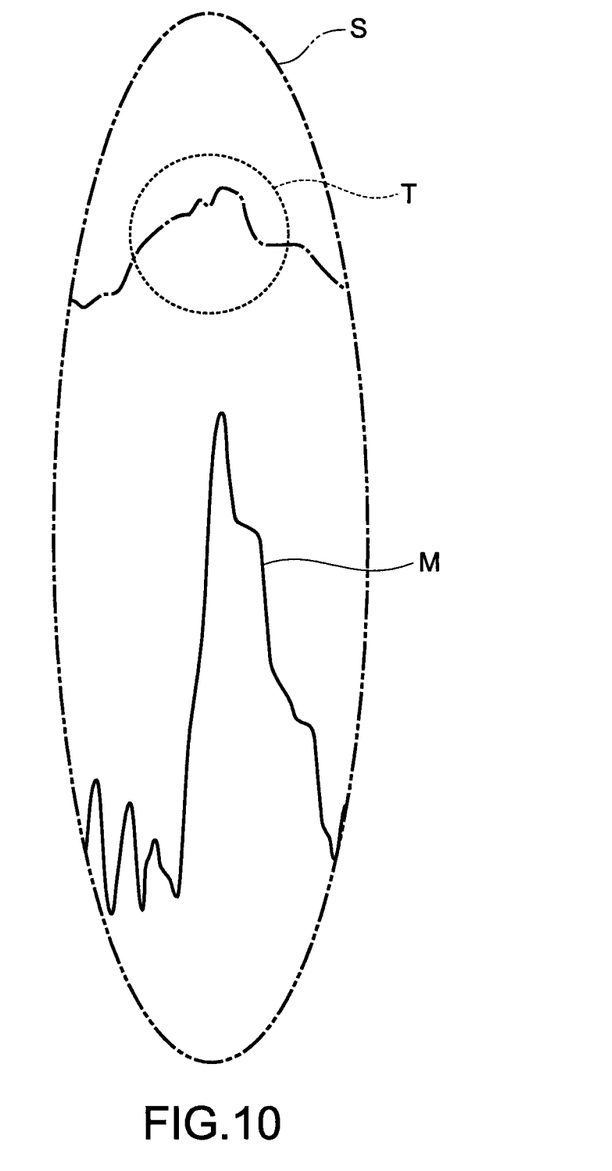
FIG. 10 is an enlarged view of a part enclosed with a chain double-dashed line in the graph shown in FIG. 9.

FIG. 10 is an enlarged view of a portion S enclosed with a chain double-dashed line in the graph of FIG. 9. The portion S in the graph shows an instant at which a pressing operation has been input by the user 30 in reality. As shown in a part T enclosed with a broken line in the graph, when a pressing operation is input to the operation surface 7, the coordinate value is also displaced in the shape of a spike. In other words, along with the pressing operation, the coordinate value is also displaced as well as the capacitance value. This may be caused by, for example, a shift of a finger and a change in contact area, which accompany the pressing operation.

In this embodiment, a pressing operation is determined by not setting only the displacement of a capacitance value as a determination reference but setting the displacement of a capacitance value and the displacement of a coordinate value as determination references. Specifically, attention is given to a correlation between the displacement of a capacitance value and the displacement of a coordinate value so that a pressing operation can be determined highly accurately.

Figure 11:
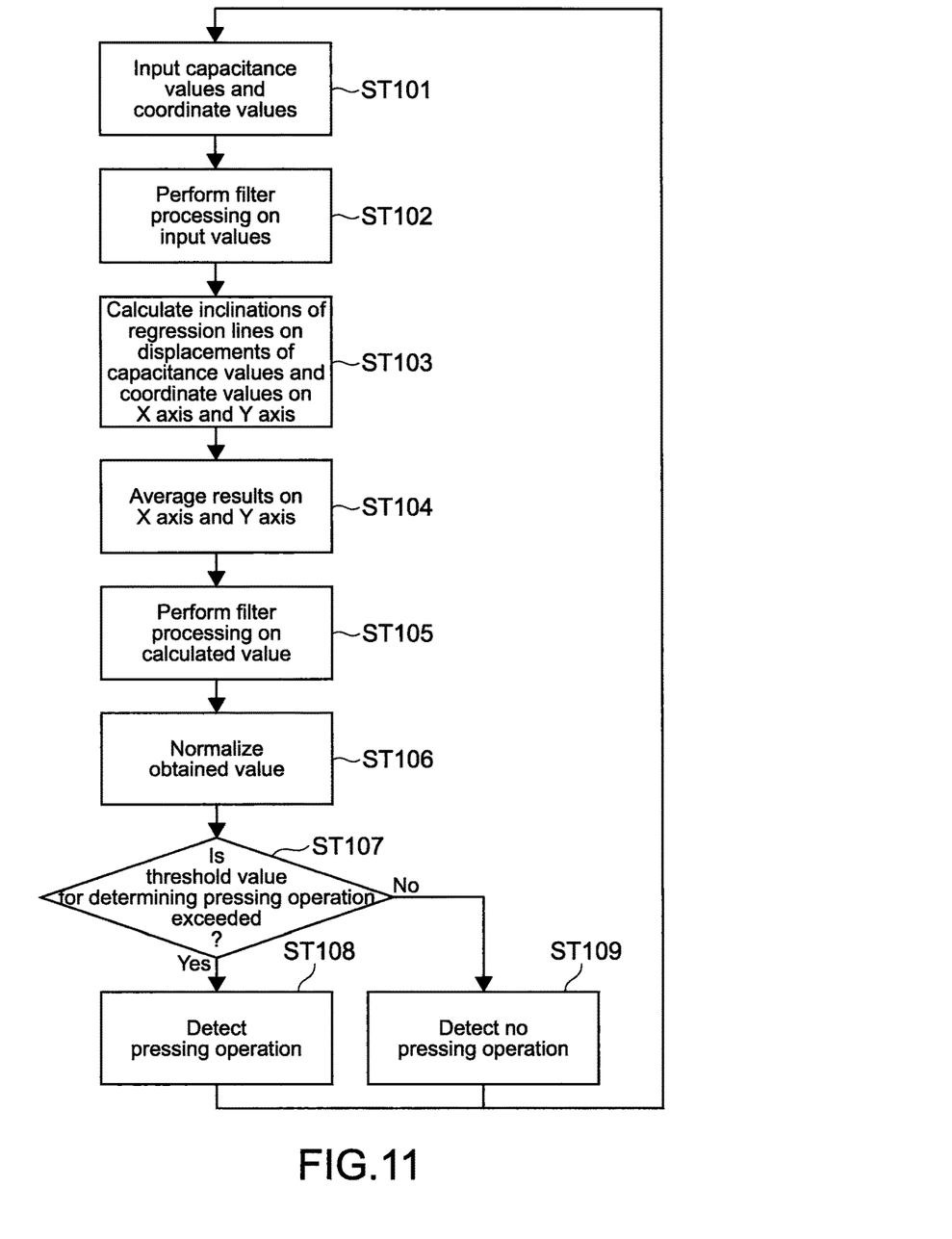
FIG. 11 is a flowchart showing an example of press determination processing according to the first embodiment.

FIG. 11 is a flowchart showing an example of the press determination processing according to this embodiment.

The capacitance value and the coordinate value shown in FIG. 9 are input (Step 101). The input capacitance value and coordinate value are subjected to filter processing (Step 102). The filter processing is executed so as to remove noise from the input capacitance value and coordinate value, for example. Accordingly, accuracy of the press determination processing is improved. It should be noted that the Step 102 is not necessarily performed and only needs to be performed as necessary.

A regression line is drawn for a displacement of the capacitance value and that of the coordinate value, and an inclination thereof is calculated. In this embodiment, a regression line on the displacement of the coordinate value on the X axis and a regression line on the displacement thereof on the Y axis are each drawn. Then, two inclinations of those regression lines are calculated (Step 103).

Figure 12:
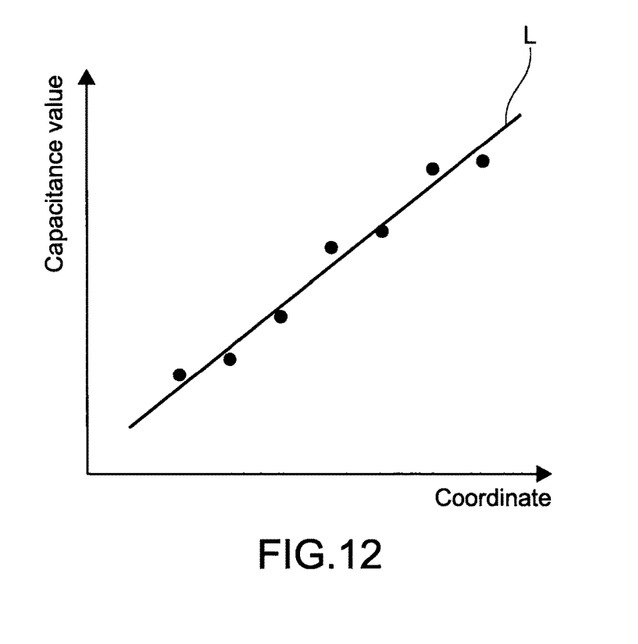
FIG. 12 is a schematic graph for describing a regression line on a displacement of the capacitance value and that of the coordinate value according to the first embodiment.

FIG. 12 is a schematic graph for describing a regression line on the displacement of the capacitance value and that of the coordinate value. As shown in FIG. 12, in this embodiment, a regression line L on the displacement of the capacitance value with respect to the displacement of the coordinate value is drawn. Then, an inclination of the regression line L is calculated.

An average value of the inclination of the regression line on the displacement on the X axis and the inclination of the regression line on the displacement on the Y axis is calculated (Step 104).

The calculated average value is subjected to filter processing (Step 105) and then subjected to normalization processing in Step 106. In this embodiment, the normalized value is set to a pressing operation determination value. However, the filter processing and the normalization processing in Steps 105 and 106 may not be performed. In this case, the average value calculated in Step 104 is used as it is as a pressing operation determination value.

Figure 13:
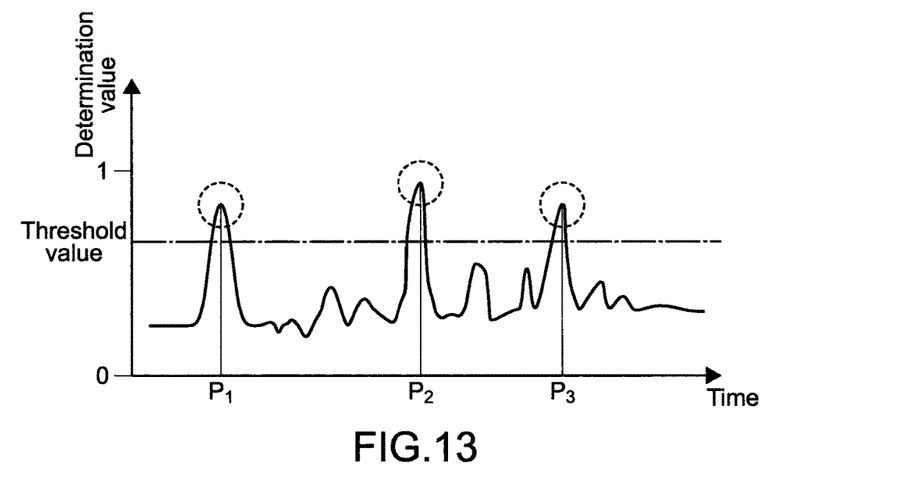
FIG. 13 is a schematic graph for describing determination processing with a determination threshold value shown in FIG. 11 as a reference.

Whether the pressing operation determination value exceeds a threshold value for determining a pressing operation is determined (Step 107). FIG. 13 is a schematic graph for describing the determination processing in Step 107. As shown in FIG. 13, in the case where the pressing operation determination value exceeds the threshold value, an input of the pressing operation at that time is detected (Step 108). In the graph shown in FIG. 13, pressing operations are determined at times $P_1$, $P_2$, and $P_3$. On the other hand, in the case where the pressing operation determination value does not exceed the threshold value, an input of the pressing operation is not detected (Step 109).

As shown in FIG. 10, when a pressing operation is input, the capacitance value and the coordinate value are displaced in the shape of a spike. In addition, as compared to the displacement of the coordinate value, the displacement of the capacitance value is large. Therefore, the inclination of the regression line described above can be adopted as a pressing operation determination value. It should be noted that the threshold value can be set as appropriate based on a structure, sensitivity, and the like of the sensor 102.

As described above, in the portable terminal 100 as the information processing apparatus according to this embodiment, the displacement of the operation point 11 is detected based on the change in capacitances of the sensor electrodes 8. Further, a press to the operation surface 7 is determined based on the displacements of the capacitance values of the sensor electrodes 8 and the displacement of the operation point 11. Accordingly, it is possible to determine a pressing operation highly accurately. In the case where continuous pressing operations are performed while moving the finger 31 and the like on the operation surface 7 as shown in FIG. 8, for example, the pressing operation can be determined accurately.

Further, the capacitance value described above is defined as appropriate, with the result that a pressing operation can be determined using a touch panel of a capacitive system, with which coordinate values of the operation point 11 are detected based on the change of a capacitance.

Further, a device such as a mechanical switch or a pressure sensor is unnecessary in order to detect an input of the pressing operation to the operation surface 7. Therefore, downsizing of the portable terminal 100, a reduction in costs, and the like can be achieved.

Second Embodiment

A second embodiment of the present disclosure will be described. In the first embodiment described above, as the pressing operation determination value, the inclinations of the regression lines on the displacements of the capacitance value and the coordinate value are used. However, as information on a correlation between the displacement of the capacitance value and that of the coordinate value, a correlation coefficient may be calculated. Then, the correlation coefficient may be used as a pressing operation determination value. In other words, when the correlation coefficient exceeds a threshold value, an input of a pressing operation is detected.

Third Embodiment

A third embodiment of the present disclosure will be described. In this embodiment, a multipoint detection sensor is used as a sensor of a capacitive system.

Figure 14:
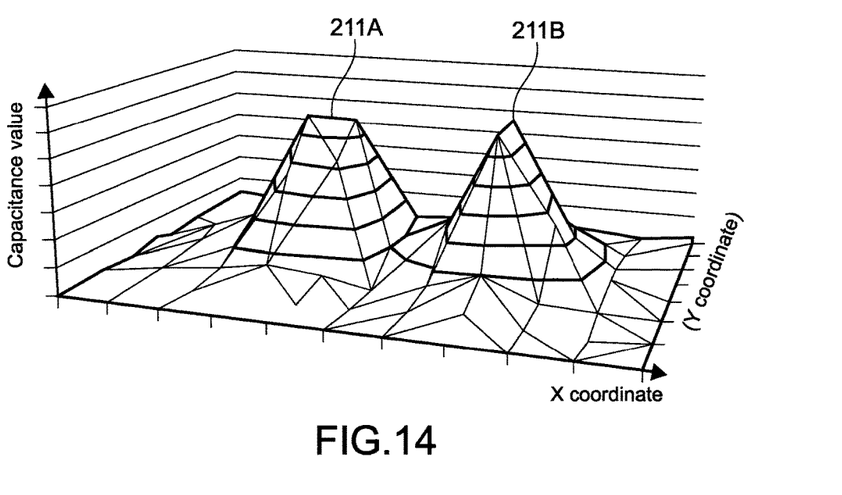
FIG. 14 is a graph showing an example of capacitance values on two operation points detected by a sensor according to a third embodiment of the present disclosure.

FIG. 14 is a graph showing an example of capacitance values on two operation points 211A and 211B detected by a sensor according to this embodiment.

In this embodiment, a capacitance value and coordinate values are calculated for each of the operation points 211A and 211B. Then, the press determination processing shown in FIG. 11 is executed for each of the operation points 211A and 211B. Accordingly, in the multipoint detection sensor, pressing operations at the plurality of operation points 211A and 211B can be determined. It should be noted that the number of operation points is not limited to two.

Fourth Embodiment

A fourth embodiment of the present disclosure will be described. A sensor according to this embodiment also outputs capacitance values at the plurality of operation points 211A and 211B as shown in FIG. 14. Further, as shown in the following description, pressing operations at the two operation points 211A and 211B are determined.

Figure 15:
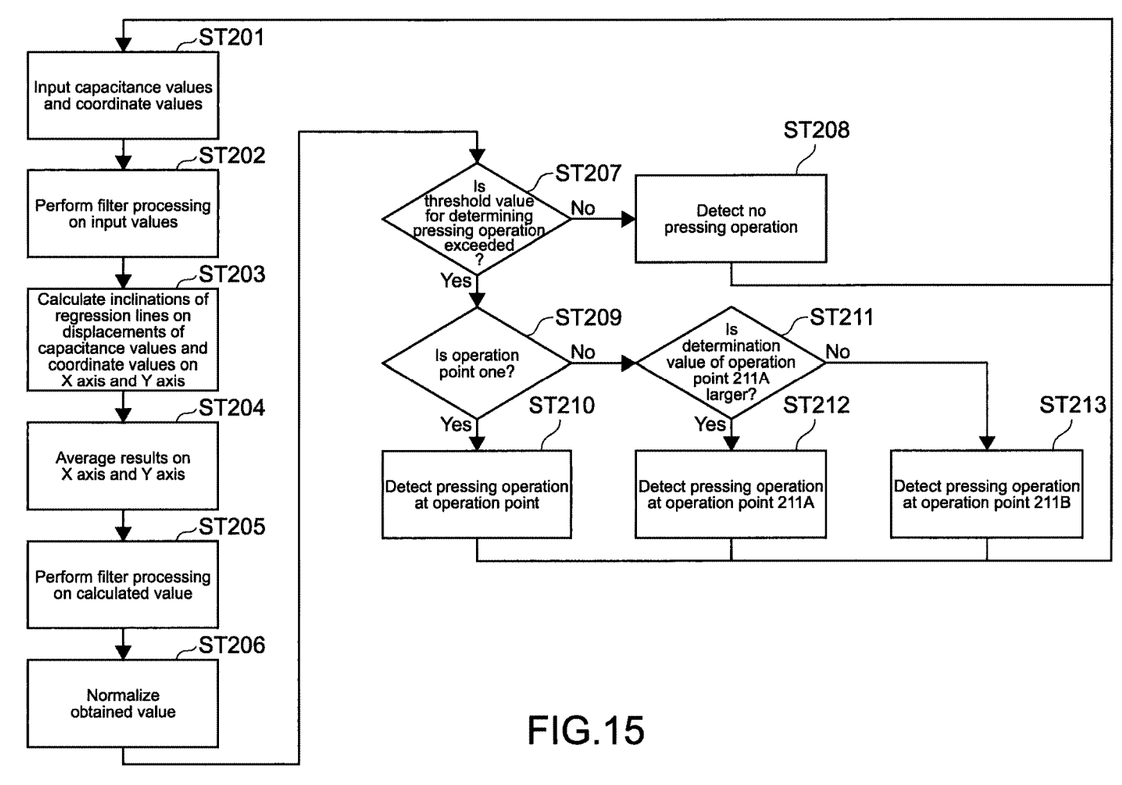
FIG. 15 is a flowchart showing an example of press determination processing executed in a portable terminal according to a fourth embodiment of the present disclosure.

FIG. 15 is a flowchart showing an example of press determination processing executed in a portable terminal of this embodiment. Processing in Step 201 to Step 208 shown in FIG. 15 is the same as that in Step 101 to Step 107 and Step 109 shown in FIG. 11.

In Step 207, in the case where the pressing operation determination value exceeds the threshold value, it is determined whether the number of operation points detected at that point in time is one or not (Step 209). The number of operation points only needs to be determined based on the capacitance values as shown in FIG. 14, for example.

In the case where it is determined that the number of operation points is one, an input of the pressing operation at that operation point is detected (Step 210).

In the case where it is determined that the number of operation points is not one, it is determined whether, out of the operation points 211A and 211B shown in FIG. 14, a pressing operation determination value of the operation point 211A is larger than that of the operation point 211B or not (Step 211).

In the case where it is determined that the pressing operation determination value of the operation point 211A is larger, an input of the pressing operation at that operation point 211A is detected (Step 212). On the other hand, in the case where it is determined that the pressing operation determination value of the operation point 211A is smaller, an input of the pressing operation at the operation point 211B is detected (Step 213). In other words, out of the plurality of operation points 211A and 211B, an input of a pressing operation at the operation point at which a pressing operation determination value is larger is detected.

Figure 16:
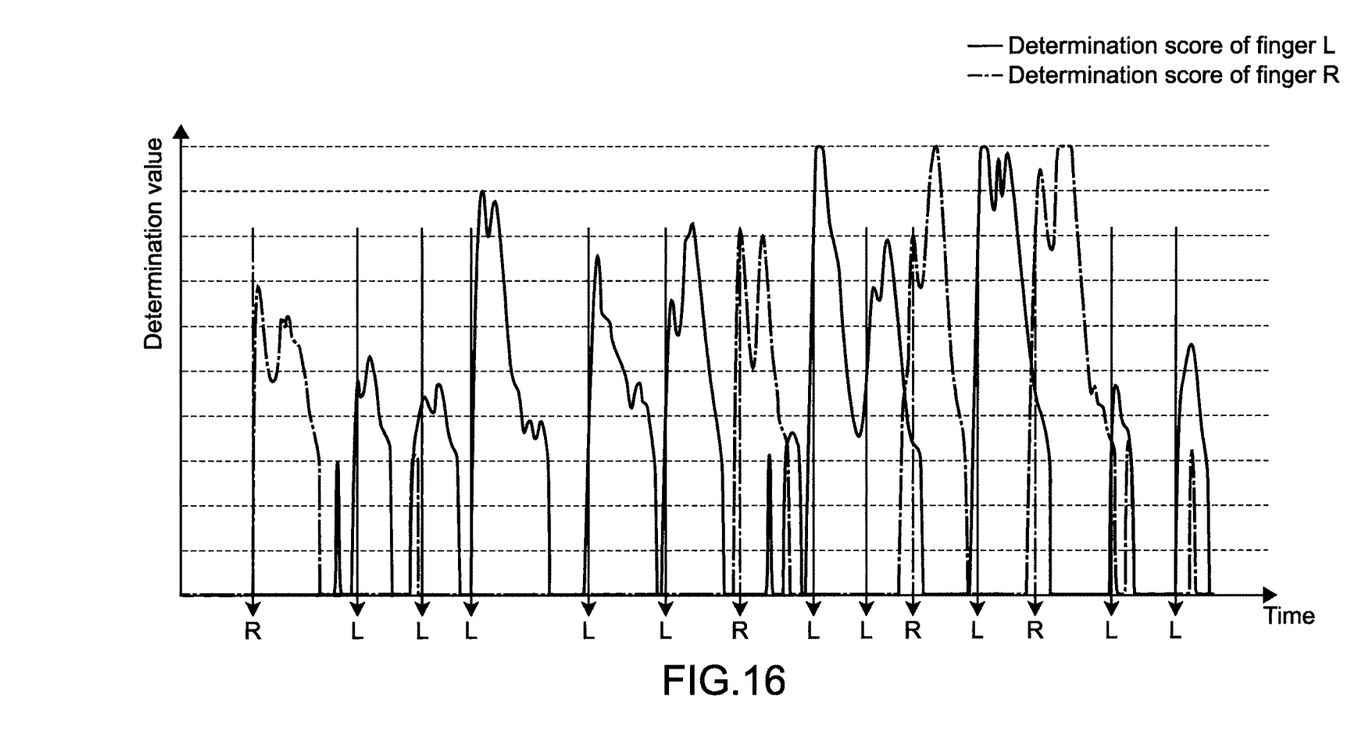
FIG. 16 is a schematic graph showing an example of a pressing operation determination value calculated by an algorithm shown in FIG. 15.

FIG. 16 is a schematic graph showing an example of the pressing operation determination value calculated by the algorithm shown in FIG. 15. Here, two left and right fingers L and R are each moved on the operation surface. Then, a pressing operation made by any of the fingers is repeatedly input.

Arrows L in FIG. 16 each show an instant at which a pressing operation is input with the left finger L. Arrows R each show an instant at which a pressing operation is input with the right finger R.

As shown in FIG. 16, in the pressing operations indicated with the arrows L and R, a pressing operation determination value is increased. Further, the pressing operation indicated with the arrow L is detected as a pressing operation determination value of the left finger L. On the other hand, the pressing operation indicated with the arrow R is detected as a pressing operation determination value of the right finger R. In other words, it has been found that by setting a threshold value of a pressing operation determination value as appropriate, pressing operations at the plurality of operation points 211A and 211B can be determined highly accurately.

It should be noted that in the third and fourth embodiments, the correlation coefficient described in the second embodiment may be used as a pressing operation determination value.

Modified Example

The embodiments of the present disclosure may be variously modified without being limited to the embodiments described above.

Figure 17:
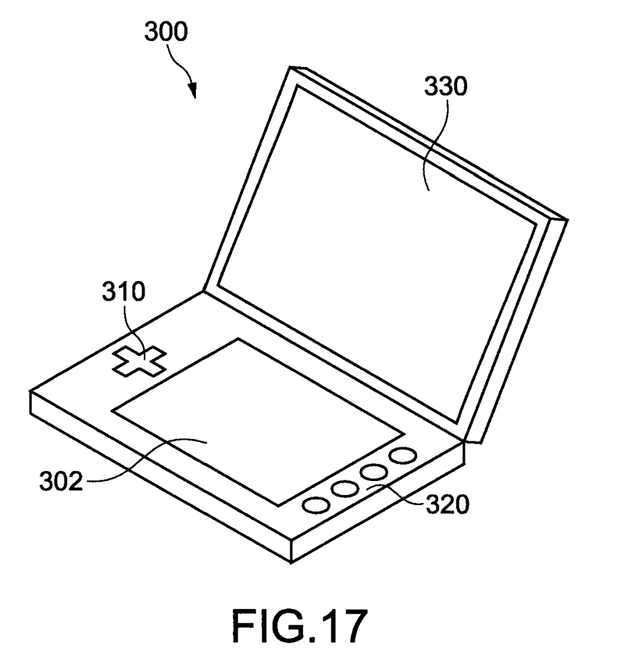
FIG. 17 is a schematic perspective view showing a modified example of the portable terminal shown in FIG. 1.

For example, FIG. 17 is a schematic perspective view showing a modified example of the portable terminal 100 shown in FIG. 1. A portable terminal 300 includes a touchpad 302, a direction key 310, operation buttons 320, and a display screen 330. The algorithm described in the embodiments described above may be applied to operations on the touchpad 302 of such a portable terminal 300. Accordingly, pressing operations at one or more operation points with respect to the touchpad 302 can be determined highly accurately.

As the information processing apparatuses according to the embodiments of the present disclosure, an electronic apparatus such as a laptop PC (personal computer) including a touch panel, a touchpad, or the like may be used. In addition, a computer including a touch panel, a touchpad, or the like may be used.

In the above description, a sensor of a projected capacitive system is used. However, if a capacitance value can be defined as appropriate, the structure and the like of the sensor that drives in the capacitive system are not limited. Further, the definition and a calculation method for a capacitance value are also not limited.

In FIG. 10, the coordinate value is displaced in the shape of a spike along with a pressing operation. This means that the operation point is slightly moved in a positive direction of the X-axis direction. However, along with the pressing operation, it can also be considered that the operation point is moved in a negative direction of the X-axis direction. In this case, the coordinate value is displaced in a concave shape. Even in such a case, for example, use of an absolute value or the like of a displacement amount of the coordinate value allows a pressing operation to be determined highly accurately.

In the above description, the capacitance value is output from the sensor to the CPU, and position detection processing and the press determination processing are executed by the CPU. However, the sensor may include a controller such as a CPU and execute the position detection processing and the press determination processing. Further, blocks that perform the press determination processing based on the capacitance value and the coordinate value may be separately provided. In other words, the detection unit and the determination unit may be realized by software or hardware.

In the above description, during a time in which an operation is being made with the finger and the like, the press determination processing shown in FIG. 11 is executed. However, when a threshold value is set for a capacitance value output from the sensor and the capacitance value exceeds the threshold value, the press determination processing shown in FIG. 11 may be started.

In Step 103 of FIG. 11, the inclinations of the two regression lines on the X axis and the Y axis are calculated. Then, in Step 104, an average value of the two inclinations is calculated. However, a combination value may be used instead of the average value. Further, a regression line on any of the X axis and the Y axis may be drawn so that an inclination thereof is calculated. Then, a pressing operation may be determined based on the inclination of the one axis. Accordingly, it is possible to achieve reduction in computation amount and costs.

In the above description, the displacement of the operation point is detected based on the change of a position where a capacitance value is high. However, the capacitance value may not be used in order to detect the displacement of the operation point. Specifically, the displacement of the operation point is detected by various techniques that are based on a change in capacitances of sensor electrodes. For determination of a pressing operation, the capacitance value as described above may be calculated.

In the above description, the inclination of the regression line or the correlation coefficient is used as the pressing operation determination value, but the pressing operation determination value is not limited thereto. Other values may be used as a parameter that represents a correlation between the displacement of the capacitance value and the displacement of the coordinate value. For example, a parameter obtained by combining the inclination of the regression line and the correlation coefficient described above with each other as appropriate, such as a sum or a product of the inclination of the regression line and the correlation coefficient, may be used.

It should be noted that the present disclosure can take the following structures.

(1) An information processing apparatus, including:

a sensor electrode that has a capacitance changed in accordance with an operation to an operation surface;

a detection unit configured to detect, based on a change of the capacitance, a displacement of an operation point of the operation surface; and a determination unit configured to determine a press to the operation surface based on a displacement of a capacitance value of the sensor electrode and the displacement of the operation point.

(2) The information processing apparatus according to Item (1), in which the detection unit calculates a coordinate value of the operation point, and the determination unit determines the press based on a correlation between the displacement of the capacitance value and a displacement of the coordinate value.

(3) The information processing apparatus according to Item (2), in which the determination unit determines the press based on an inclination of a regression line of the capacitance value and the coordinate value.

(4) The information processing apparatus according to Item (2), in which the determination unit determines the press based on a correlation coefficient between the capacitance value the coordinate value.

(5) The information processing apparatus according to any one of Items (2) to (4), in which the detection unit calculates the coordinate value of each of a plurality of operation points, and the determination unit determines the press at each of the plurality of operation points.

(6) An information processing method, including:

detecting, by a detection unit, a displacement of an operation point of an operation surface based on a capacitance of a sensor electrode that is changed in accordance with an operation to the operation surface; and determining, by a determination unit, a press to the operation surface based on a displacement of a capacitance value of the sensor electrode and the displacement of the operation point.

(7) A program causing a computer to function as:
a detection unit configured to detect a displacement of an operation point of an operation surface based on a capacitance of a sensor electrode that is changed in accordance with an operation to the operation surface; and
a determination unit configured to determine a press to the operation surface based on a displacement of a capacitance value of the sensor electrode and the displacement of the operation point.

(8) The program according to Item (7), in which
the detection unit calculates a coordinate value of the operation point, and
the determination unit determines the press based on a correlation between the displacement of the capacitance value and a displacement of the coordinate value.

(9) The program according to Item (8), in which
the determination unit determines the press based on an inclination of a regression line of the capacitance value and the coordinate value.

(10) The program according to Item (8), in which
the determination unit determines the press based on a correlation coefficient between the capacitance value the coordinate value.

(11) The program according to any one of Items (8) to (10), in which
the detection unit calculates the coordinate value of each of a plurality of operation points, and
the determination unit determines the press at each of the plurality of operation points.

The present disclosure contains subject matter related to that disclosed in Japanese Priority Patent Application JP 2011-064045 filed in the Japan Patent Office on Mar. 23, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a sensor electrode that has a capacitance changed in accordance with an operation by an operation object made upon or in proximity to an operation surface;
a detection unit configured to detect, based on the change of the capacitance, a displacement of a coordinate value of an operation point of the operation surface, wherein the operation point corresponds to a point at which the operation object comes into contact with or comes within a proximity range to the operation surface; and
a determination unit configured to determine a press to the operation surface based on the change over a time period of the capacitance value of the sensor electrode at the operation point and the displacement of the coordinate value of the operation point,
wherein the detection unit and the determination unit are each implemented via at least one processor.

2. The information processing apparatus according to claim 1, wherein
the detection unit calculates the coordinate value of the operation point, and
the determination unit determines the press based on a correlation between the change of the capacitance value and the displacement of the coordinate value.

3. The information processing apparatus according to claim 2, wherein
the determination unit determines the press based on an inclination of a regression line of the capacitance value and the coordinate value.

4. The information processing apparatus according to claim 2, wherein
the determination unit determines the press based on a correlation coefficient between the capacitance value and the coordinate value.

5. The information processing apparatus according to claim 2, wherein
the detection unit calculates the coordinate value of each of a plurality of operation points, and
the determination unit determines the press at each of the plurality of operation points.

6. An information processing method, comprising:
detecting, by a detection unit, a displacement of a coordinate value of an operation point of an operation surface based on a capacitance of a sensor electrode that is changed in accordance with an operation by an operation object made upon or in proximity to the operation surface, wherein the operation point corresponds to a point at which the operation object comes into contact with or comes within a proximity range to the operation surface; and
determining, by a determination unit, a press to the operation surface based on the change over a time period of the capacitance value of the sensor electrode at the operation point and the displacement of the coordinate value of the operation point,
wherein the detection unit and the determination unit are each implemented via at least one processor.

7. The information processing method according to claim 6, further comprising:
calculating the coordinate value of the operation point, and
determining the press based on a correlation between the change of the capacitance value and the displacement of the coordinate value.

8. The information processing method according to claim 7, further comprising:
determining the press based on an inclination of a regression line of the capacitance value and the coordinate value.

9. The information processing method according to claim 7, further comprising:
determining the press based on a correlation coefficient between the capacitance value and the coordinate value.

10. The information processing method according to claim 7, further comprising:
calculating the coordinate value of each of a plurality of operation points, and
determining the press at each of the plurality of operation points.

11. A non-transitory computer-readable medium having embodied thereon a program, which when executed by a computer causes the computer to execute a method, the method comprising:
detecting a displacement of a coordinate value of an operation point of an operation surface based on a capacitance of a sensor electrode that is changed in accordance with an operation by an operation object made upon or in proximity to the operation surface, wherein the operation point corresponds to a point at which the operation object comes into contact with or comes within a proximity range to the operation surface; and determining a press to the operation surface based on the change over a time period of the capacitance value of the sensor electrode at the operation point and the displacement of the coordinate value of the operation point.

12. The non-transitory computer-readable medium according to claim 11, wherein the method further comprises:

calculating the coordinate value of the operation point, and determining the press based on a correlation between the change of the capacitance value and the displacement of the coordinate value.

13. The non-transitory computer-readable medium according to claim 12, wherein the method further comprises:

determining the press based on an inclination of a regression line of the capacitance value and the coordinate value.

14. The non-transitory computer-readable medium according to claim 12, wherein the method further comprises:

determining the press based on a correlation coefficient between the capacitance value and the coordinate value.

15. The non-transitory computer-readable medium according to claim 12, wherein the method further comprises:

calculating the coordinate value of each of a plurality of operation points, and determining the press at each of the plurality of operation points.

* * * * *